United States Patent Office 3,040,764
Patented June 26, 1962

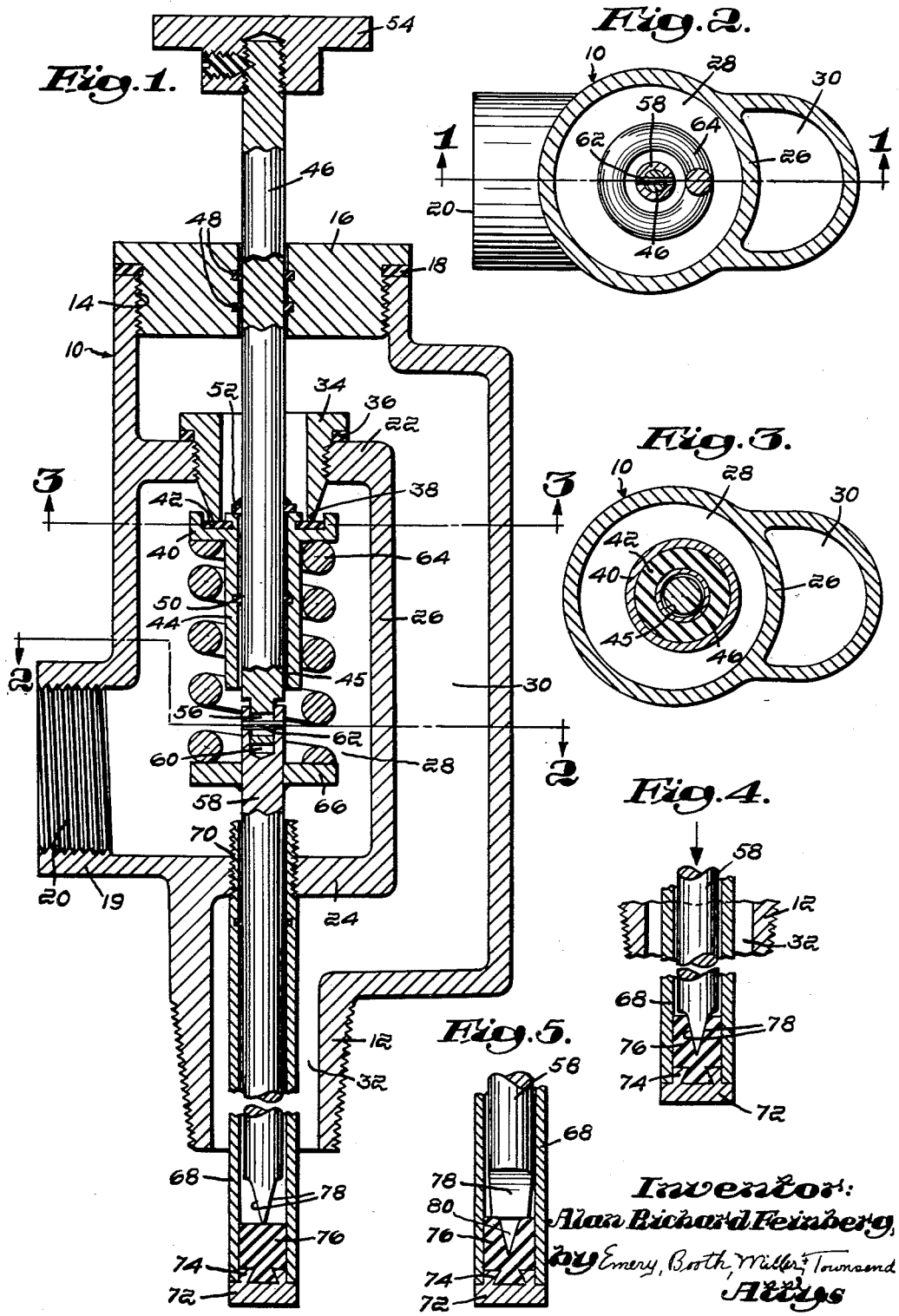

3,040,764
TEMPERATURE AND PRESSURE RELIEF VALVE
Alan R. Feinberg, 536 Clinton Road, Brookline, Mass.
Filed July 20, 1960, Ser. No. 44,046
7 Claims. (Cl. 137—73)

This invention relates to valves and more particularly to relief valves such as are associated with fluid storage tanks or supply lines leading therefrom and which are actuated in response to predetermined fluid temperature or fluid pressure conditions within the tank.

Valves of the type here concerned are commonly made temperature responsive by means of a fusible mass the melting of which disengages a spring normally biasing the valve member against its seat. The fusible element generally is in close proximity to the tank fluid and such as to be melted when that fluid reaches a certain critical temperature. The resultant release or opening of the valve permits a pressure reducing flow of the fluid from the tank and thereby prevents tank explosion.

The conventional constructions are also pressure responsive in that the force of the spring which biases the valve is calculated to be overcome when the fluid pressure within the tank reaches a predetermined magnitude upon which the valve is again opened automatically to allow at least an excess-pressure-relieving fluid flow.

But it has been found that in use these described conventional relief valves frequently settle fast in the closed position, due either to the adhering to the valve seat or to the actual deterioration of the valve gasket and such as resulting from extended periods of use without actuation. When during such use the tank pressure or temperature does exceed the critical value, the mentioned sticking of the valve serves of course to greatly increase the danger of tank explosion. This condition necessitates the frequent dismantling of the valve for cleaning and inspection and consequently a costly amount of down time for the entire fluid line.

Further, the efficiency of the valve here concerned has suffered because no provision has heretofore been made for renewing the capacity of the valve for temperature responsive actuation, at least not without the necessity of dismantling the valve.

Still further, the subject fluid valve devices have lacked means for their external manual actuation, as for testing and other desirable purposes, and in combination with the temperature and pressure responsive features.

The present invention provides an improved relief valve which is responsive to predetermined pressure and temperature values and which also may be manually actuated from without itself for testing or other special purposes.

The reliability of the relief valve is improved under this invention and more particularly by providing manually operable means for enabling the valve to be unseated to insure that none of the parts are stuck or deteriorated and that the valve will be ready for efficient and proper response despite long periods of no automatic response of the valve. The relief valve of this invention is advantaged also in that the described manually manipulable opening means is provided or mounted exteriorly of the valve housing, whereby the unseating may be done without the necessity of dismantling the valve or shutting down the line and without disturbing the setting of the pressure and temperature responsive elements of the valve.

Also desirably under the invention and following its temperature responsive actuation, the valve may be quickly and correctly reset to the operative closed position without the necessity of dismantling the valve or gaining access to its interior, and without stopping the flow to the valve of the fluid which is being controlled.

In the accompanying drawing:

FIGURE 1 is a side elevation of a relief valve embodying features of my invention, in medial cross-section on line 1—1 of FIGURE 2.

FIGURE 2 is a cross-sectional view on line 2—2 of FIGURE 1.

FIGURE 3 is a cross-sectional view on line 3—3 of FIGURE 1.

FIGURE 4 is a fragmentary cross-sectional view illustrating the spring-pressure reducing action which ensues when the fusible body melts, and FIGURE 5 is a view generally similar to FIGURE 4 but showing the strut rod in re-set condition with its chiseled edge rotated to extend across the groove of the resolidified fusible body.

Referring to the drawing, the valve casing, indicated generally at 10, has an exteriorly threaded nose portion 12 which is adapted to be screwed into a suitable threaded opening in a wall of a storage tank or pipe leading therefrom containing the fluid which is to be controlled, such as hot water, for example.

The casing 10 further has an access opening 14 generally opposite the nose 12 and through which interior elements of the valve may be inserted. Said access opening 14 is seen as being closed by a sealing plug 16 and gasket 18.

The casing 10 is provided further with a laterally disposed neck portion 19 having an interiorly threaded outlet opening 20 therein which may be connected to any suitable conduit for conducting away the hot water or other fluid whose excess temperature or pressure is relieved by the operation of the invention valve.

The interior space within casing 10 is divided by partition wall portions 22, 24, 26 to provide an outlet chamber 28, which communicates with outflow opening or outlet 20, and an interior chamber 30 which communicates with an inflow passage or inlet 32 through nose 12. The partition wall portions 22, 24 are seen as arranged in spaced lateral parallelism opposite and spaced from the openings 14, 32 and joined interiorly of the casing 10 by vertical wall 26.

A flanged sleeve member 34 with gasket 36 is threaded through an opening in the upper lateral partition wall portion 22 and tapers at its inner end projected within the outlet chamber 28 to a narrow annular rim or seat 38. A tubular valve sleeve or valve member having an upper flange 40 is arranged to engage said seat by a recessed gasket 42, and has a depending reduced-diameter shank or stem 44 vertically aligned with its bore 45 centrally of the sleeve 34.

An actuating member or rod 46 is seen to extend from without the casing 10 through plug 16, sleeve member 34, and valve member 40, and to be sealed through plug 16 by O ring or the like gaskets 48, 48 and through sleeve bore 45 by the similar ring 50, all said sealing gaskets or rings 48, 48 and 50 having a fluid tight sliding fit with the rod 46. A ring or other detent 52 is welded or otherwise formed on the rod 46 and is arranged to engage flange 40 of, and thereby to limit the upward movement on rod 46 of, the valve sleeve 40, 44. The actuating member 46 is fitted at its outer end with a suitable knob or handle 54 by which it may be manually manipulated as hereinafter described.

The actuating member 46 is formed at its other end with a reduced diameter portion having a lateral through opening or slot 56 and receiving thereon one end of a strut rod 58. Strut rod 58 has a recess 60 at said one end for the indicated sliding fit over the reduced diameter portion of actuating member 46.

A pin 62 mounted transversely of strut 58 spans recess 60 and also extends through slot 56 for connecting rod 58 to actuating member 46. The pin 62 is seen to be of lesser longitudinal extent than slot 56 and so to allow limited relative sliding movement of the actuating member and strut rod 46, 58.

A relatively heavy coil spring 64 surrounds the valve sleeve and is compressed between its flange 40 and a plate or abutment 66 on strut 58. The strut 58 and with it the rod 46 are thereby urged downwardly of the housing 10, as later to be mentioned.

A probe element or tube 68 is received in inlet 32 and has its one end threaded as at 70 through partition wall 24. The probe tube 68 extends at its other end a distance beyond the end of nose 12 as suitably for intimate contact with the hot water or other fluid within the storage tank or the line with which the relief valve is associated, and is there closed by a cap or plug 72. The plug 72 has at its inner face an under-cut recess 74 in which is anchored a mass or body 76 of fusible material such as solder, for example. Under the invention the fusible material is flowed into the probe tube in a molten state and upon cooling and solidifying becomes locked in place, as against lifting away from the closure member 72.

Strut rod 58 extends slidably and rotatably within the probe tube 68 and has its lower end therewithin oppositely beveled as at 78 to provide a chisel-like edge or point which by the expanding force of spring 66 is urged or pressed against fusible body 76. Hence, whenever the fusible body 76 melts the beveled end of strut rod 58 is forced and advances into the melted material as shown in FIG. 4, thereby releasing or disengaging the spring 64 so that its pressure on the valve member 40 is reduced sufficiently to permit opening of the valve and escape of fluid through the casing to the outlet opening 20.

In its pressure responsive operation the valve herein described will relieve the tank pressure, as may be communicated through inlet chamber 30 to push against the valve member 40, whenever that pressure increases to a value sufficient to overcome the force of spring 64, the excessive tank pressure then being dissipated by fluid passage past the valve into outflow chamber 28.

Further in accordance with the invention, the valve may, following actuation to relieve excessive temperature of the controlled fluid, be restored to the operative closed position without the necessity of shutting the valve off from the controlled fluid volume, or dismantling any part of the valve, or even of gaining access to the interior of the valve casing. It will be understood that the fusible body 76 is of a material selected to melt at a predetermined relieving temperature, and that the spring 64 is of a material and under a compression between the valve flange 40 and strut plate 66 to be overcome by a predetermined relieving pressure.

Considering now the temperature relief, when the fusible body 76 melts spring 64 acts to thrust strut 58 away from valve flange 40 to the extent permitted by the movement of pin 62 in closing the FIG. 1 spacing from and engaging against the lower end of slot 56. The initial downward shift of rod 58 is sufficient to advance its chisel-like end or point from the FIG. 1 position part way into the melted mass 76 and correspondingly to reduce the pressure of spring 64. The valve opens, and the pressure of the escaping fluid flow on the valve face urges rod 58 downwardly further still and to immerse the chisel end of strut 58 in molten mass 76 as shown in FIG. 4. This described excessive temperature induced actuation of the valve will be understood to be a rapid and positive action, and to proceed irrespective of the orientation or rotative position of rod 46. It will be further noted that the valve will automatically actuate in response to the critical temperature even in the absence of the above described spring thrust of strut 58 away or downwardly from valve flange 40. In other words, and following the melting of fusible body 76, the combined forces of gravity and fluid pressure (acting on sleeve 40 and through spring 64 on strut 58) would suffice to depress the entire valve and actuating rod assembly into the molten mass.

Assuming now that the fluid temperature has cooled to a point at which the fusible body 76 will sufficiently harden or solidify, the valve hereof may be restored or re-set to the operative closed position merely by grasping the knob or handle 54, pulling outwardly on actuating rod 46, and then manually rotating the rod, preferably through 90° to a position at right angles as shown in FIG. 5. In this the withdrawal of the chisel-like edge of strut 58 from the now resolidified fusible body 76 leaves in that body a V-shaped groove 80, which is crossed by the chisel edge upon its described quarter turn rotation by twisting the rod 46 and with it the strut 58. The valve is now reset and ready for continued effective temperature-responsive action with the same operating characteristics as before.

It will be understood that upon subsequent meltings of the fusible body 76 due to excessive temperature, the one V-shaped groove 80 will fill as the next is wedged out, whereby body 76 will at all times be in condition for the above described resetting operation.

Further according to the invention, the valve may be manually manipulated, as for testing, or for relieving the pressure on the associated tank or fluid line, from without and without entering the casing 10 and without dismantling or otherwise interrupting the operation of the valve. Such manual testing or actuating merely calls for grasping handle 54 and pushing inward on actuating rod 46 to unseat valve flange 40. In this, detent 52 abuts against valve flange 40 to force it and spring 64 away from valve seat 38 for a distance permitted by the clearance of slot 56 on the high side of pin 62.

I claim:

1. A valve comprising a casing having an inflow opening and an outflow opening, a wall interiorly of the casing separating the said inflow and outflow openings and itself having a controlled opening therethrough for passage within the casing of fluid from the inflow opening to the outflow opening thereof, a valve sleeve movably arranged within said casing for closing said controlled opening, a tubular probe means having one end opened interiorly of the casing and having another portion extending out of the casing and adapted to be subjected to the temperature of the fluid, the projected end of said another portion of the probe means being closed, a body of fusible material within said closed projected end of the probe means, a strut member extending slidably and rotatably within said probe means and having one end portion beveled to provide a chisel-like edge for engaging against said body of fusible material and having its opposite end terminating within said casing, an abutment on said strut member, a coil spring under compression between said valve sleeve and said abutment biasing said valve sleeve to closed position and said chisel-like edge of the strut member into engagement with said fusible body, said edge of said strut member becoming pressed substantially into said fusible body in response to melting of the latter thereby substantially reducing the biasing effect of said spring on said valve sleeve and an actuating member having a lost-motion connection to said opposite end of said strut member and extending through said valve sleeve and thence out of the casing to an exterior location, said actuating member having means for engaging said valve member and being manually movable at said exterior location for opening said valve in opposition to said spring bias and for withdrawing said strut member from said fusible body following melting and resolidification of the latter, and for rotating the withdrawn strut member to dispose its chisel-like end cross-wise of its position prior to melting of said fusible body.

2. A relief valve as defined in claim 1, wherein there is means locking said fusible body when solidified against movement within said probe means when said strut member is being withdrawn from the fusible body.

3. In a valve having a casing with inlet and outflow openings therein and having a valve sleeve interiorly of the casing for controlling fluid flow through the casing between said inlet and outflow openings, the combination therewith of an actuating member extending from within said casing through said valve sleeve and thence out of the valve casing and a strut member connected interiorly of said casing to said actuating member, there being a lost motion means at the said connection of said strut member to said actuating member whereby the strut member may have appreciable movement relative to said actuating member, an abutment on said strut member, a spring under compression between said abutment and said valve sleeve biasing the latter to closed position and biasing said strut member in direction away from the valve sleeve, a hollow probe means extending out of said casing and adapted to be contacted by fluid which is to be controlled, a body of fusible material in the hollow of said probe means, said strut member extending within the hollow of said probe means and having a chisel-like edge in engagement with said fusible body whereby said edge of the strut member becomes thrust into said fusible body in response to the biasing action of said spring when said fusible body melts thereby to substantially reduce the magnitude of the spring bias on said valve sleeve, said actuating member having a detent thereon for engaging said valve sleeve and being manually operable exteriorly of the casing to open said valve sleeve in opposition to the bias of said spring, and also to withdraw said strut member from said fusible body following melting and resolidifying of the latter and to rotate the withdrawn chisel-like edge of the strut member into crossing relation to its position prior to said melting of the fusible body.

4. A valve comprising a casing having an inlet and an outlet and a passage leading within said casing between said inlet and outlet, a valve controlling said passage, a hollow probe element fixed on said casing and adapted to be subjected to fluid temperature, a body of fusible material within said probe element, a strut member having one end chisel-like and engaging said body within said probe element and having its other end terminating within said valve casing, an abutment on said strut member, a spring under compression between said abutment and said valve biasing the valve toward closed position and said strut member toward said fusible body, an actuating member connected by a lost-motion connection to said other end of said strut member and extending through said valve and thence out of said casing, said actuating member being manually operable from without the casing and having means thereon for engaging said valve whereby said valve may be opened manually at will by inward thrust of said actuating member in opposition to the valve-biasing force of said spring.

5. A pressure and temperature relief valve for controlling a fluid comprising a casing having an inlet and an outlet providing a fluid passage, means for closing said passage, casing mounted means for yieldably biasing said closing means to oppose a determined fluid pressure, temperature sensitive means supporting said biasing means, said temperature sensitive means being supported in said fluid passage at the inlet side of said casing and fusing to release said biasing means at a determined fluid temperature, said fusing being independent of the pressure of said fluid, and valve operating means extending and manipulable from without said casing to engage said closure means independently of said temperature sensitive means and in opposition to said biasing means whereby said fluid passage may be opened without disturbing the pressure responsive setting of the valve.

6. A pressure and temperature relief valve for controlling a fluid comprising a casing providing a fluid passage, means for closing said passage, casing mounted means for yieldably biasing said closing means to oppose a determined fluid pressure, temperature sensitive means arranged to extend into said fluid and supportively engaging said biasing means such that on its fusing at a determined fluid temperature said biasing means will disengage by advancing into said temperature sensitive means, and operating means associated with said biasing means and extending and manipulable from without said casing and upon the resolidifying of said heat sensitive means to withdraw the end of said biasing means from said temperature sensitive means and to return and reset said biasing means to its said engagement with said closure means.

7. A pressure and temperature relief valve comprising a casing providing a fluid passage, means for closing said passage, casing mounted means for yieldably biasing said closing means to oppose a determined fluid pressure, temperature sensitive means supportively engaging said casing mounted means at an end thereof, said casing mounted means advancing into said temperature sensitive means on the fusing of that to disengage the casing mounted means at a determined fluid temperature, and valve operating means associated with said casing mounted means and extending and manipulable from without said casing variously to engage said closure means independently of said temperature sensitive means and in opposition to said casing mounted means and upon the resolidifying of said heat sensitive means to reset the valve by withdrawing said end of said casing mounted means from said temperature sensitive means and repositioning said casing mounted means for its said supportive end engagement by said temperature sensitive means and biasing of said closure means.

References Cited in the file of this patent

UNITED STATES PATENTS

| | | |
|---|---|---|
| 2,271,786 | Watkins | Feb. 3, 1942 |
| 2,301,014 | Burklin | Nov. 3, 1942 |
| 2,375,810 | Nelson | May 15, 1945 |
| 2,661,016 | Leffler | Dec. 1, 1953 |
| 2,789,572 | Madden | Apr. 23, 1957 |
| 2,831,500 | Fennema | Apr. 22, 1958 |